United States Patent

Moore et al.

(10) Patent No.: US 9,289,685 B2
(45) Date of Patent: Mar. 22, 2016

(54) METHOD AND SYSTEM FOR PROVIDING VIRTUAL THROWING OF OBJECTS

(75) Inventors: Devin C. Moore, Lewis Center, OH (US); Wade Peebles Thompson, Moore, SC (US)

(73) Assignee: VERIZON PATENT AND LICENSING INC., Basking Ridge, NJ (US)

(*) Notice: Subject to any disclaimer, the term of this patent is extended or adjusted under 35 U.S.C. 154(b) by 355 days.

(21) Appl. No.: 13/299,380

(22) Filed: Nov. 18, 2011

(65) Prior Publication Data

US 2013/0130758 A1 May 23, 2013

(51) Int. Cl.
*H04B 7/26* (2006.01)
*A63F 13/12* (2006.01)
*A63F 13/30* (2014.01)
*A63F 13/44* (2014.01)
*A63F 13/428* (2014.01)
*G06F 3/01* (2006.01)

(52) U.S. Cl.
CPC .............. *A63F 13/12* (2013.01); *A63F 13/428* (2014.09); *A63F 13/44* (2014.09); *G06F 3/017* (2013.01); *A63F 2300/105* (2013.01); *A63F 2300/204* (2013.01); *A63F 2300/537* (2013.01); *A63F 2300/5573* (2013.01); *A63F 2300/8011* (2013.01)

(58) Field of Classification Search
CPC ......... A63F 13/10; A63F 13/12; A63F 13/20; A63F 13/21; A63F 13/211; A63F 13/216; A63F 13/235; A63F 13/30; A63F 13/31; A63F 13/32; A63F 13/327; A63F 13/33; A63F 13/332; A63F 13/34; A63F 13/40; A63F 13/42; A63F 13/428; A63F 13/44; G06F 3/017
USPC .................... 463/36, 37, 52, 53, 57
See application file for complete search history.

(56) References Cited

U.S. PATENT DOCUMENTS

2004/0102249 A1* 5/2004 Meyers et al. ................... 463/42
2005/0219211 A1* 10/2005 Kotzin et al. ................. 345/158
2006/0256074 A1* 11/2006 Krum et al. ................... 345/156

(Continued)

FOREIGN PATENT DOCUMENTS

WO    WO2011/007010 A1 *  1/2011 .............. H04W 4/02

OTHER PUBLICATIONS

"Hoccer: Exchange Information with Gesture and a Flick of the Wrist", [dated 2010]. [online], [retrieved Mar. 8, 2012]. Retrieved from the Internet <URL: http://smokinapps.com/iphone-exchange-information-with-gestures-and-a-flick-of-the-wrist/>. 6 pages.*

(Continued)

*Primary Examiner* — Lawrence Galka (57) ABSTRACT

An approach for providing virtual throwing of objects is described. Execution of virtually throwing an object as represented by a first application on a first mobile device is detected. Throwing data for the object using sensor information and location information of the first mobile device is determined. A second mobile device is selected as a candidate to virtually catch the object as represented by a second application on the second mobile device based on the throwing data and location information of the second mobile device. A successful catch of the object by the second mobile device is determined based on the throwing data and the location information of the second mobile device.

18 Claims, 10 Drawing Sheets

(56) References Cited

U.S. PATENT DOCUMENTS

| | | | |
|---|---|---|---|
| 2007/0066323 A1* | 3/2007 | Park et al. | 455/456.2 |
| 2007/0178967 A1* | 8/2007 | Rosenberg | 463/39 |
| 2008/0146339 A1* | 6/2008 | Olsen et al. | 463/42 |
| 2008/0242385 A1* | 10/2008 | Miyamoto | 463/1 |
| 2009/0017799 A1* | 1/2009 | Thorn | 455/414.1 |
| 2009/0209346 A1* | 8/2009 | Cheng et al. | 463/37 |
| 2009/0265470 A1* | 10/2009 | Shen et al. | 709/227 |
| 2010/0113153 A1* | 5/2010 | Yen et al. | 463/37 |
| 2010/0261526 A1* | 10/2010 | Anderson et al. | 463/31 |
| 2011/0043443 A1* | 2/2011 | Kawano et al. | 345/156 |
| 2011/0081923 A1* | 4/2011 | Forutanpour et al. | 455/457 |
| 2011/0088002 A1* | 4/2011 | Freer | 715/863 |
| 2011/0175822 A1* | 7/2011 | Poon et al. | 345/173 |
| 2011/0296357 A1* | 12/2011 | Kim | 715/863 |
| 2012/0038550 A1* | 2/2012 | Lemmey et al. | 345/156 |
| 2012/0040759 A1* | 2/2012 | Ito et al. | 463/37 |
| 2012/0120000 A1* | 5/2012 | Lucic et al. | 345/173 |
| 2012/0172129 A1* | 7/2012 | Vaananen | 463/37 |
| 2012/0282859 A1* | 11/2012 | Mayer et al. | 455/41.2 |
| 2014/0195925 A1* | 7/2014 | Wikander | 715/748 |

OTHER PUBLICATIONS

"App review: Hoccer", [dated 2011]. [online], [retrieved Mar. 8, 2012]. Retrieved from the Internet <URL:http://mastersofmedia.hum.uva.nl/2011/10/09/app-review-hoccer/>. 2 pages.*

"Hoccer: data sharing simplified", [dated 2010]. [online], [retrieved Mar. 7, 2012]. Retrieved from the Internet <URL:http://www.youtube.com/watch?v=2Fn1t8culTc>. 1 page.*

* cited by examiner

METHOD AND SYSTEM FOR PROVIDING VIRTUAL THROWING OF OBJECTS

BACKGROUND INFORMATION

Service providers are continually challenged to deliver value and convenience to consumers by providing compelling network services and advancing the underlying technologies. One area of interest has been the development of services and technologies relating to indoor games. For example, polyurethane foam objects have enabled activities involving object throwing, such as typical outdoor games (e.g., football, volleyball, catch, etc.) as well as some indoor games, to be performed more safely inside a home, reducing damage in the home associated with throwing of non-foam objects. As such, these outdoor games along with throwing-related indoor games can be played within the convenience of one's own home regardless of inclement weather (e.g., rain, fog, snow, etc.). Nonetheless, when thrown with enough force, the foam objects may still cause damage to lighting and other devices in the home. Moreover, walls and other barriers within the home may impede the playability of certain games, for instance, by interfering with trajectories and catch areas of foam objects thrown.

Therefore, there is a need for an effective approach for virtually throwing objects.

BRIEF DESCRIPTION OF THE DRAWINGS

Various exemplary embodiments are illustrated by way of example, and not by way of limitation, in the figures of the accompanying drawings in which like reference numerals refer to similar elements and in which.

DESCRIPTION OF THE PREFERRED EMBODIMENT

An apparatus, method and software for providing virtual throwing of objects are described. In the following description, for the purposes of explanation, numerous specific details are set forth in order to provide a thorough understanding of the present invention. It is apparent, however, to one skilled in the art that the present invention may be practiced without these specific details or with an equivalent arrangement. In other instances, well-known structures and devices are shown in block diagram form in order to avoid unnecessarily obscuring the present invention.

Figure 1:
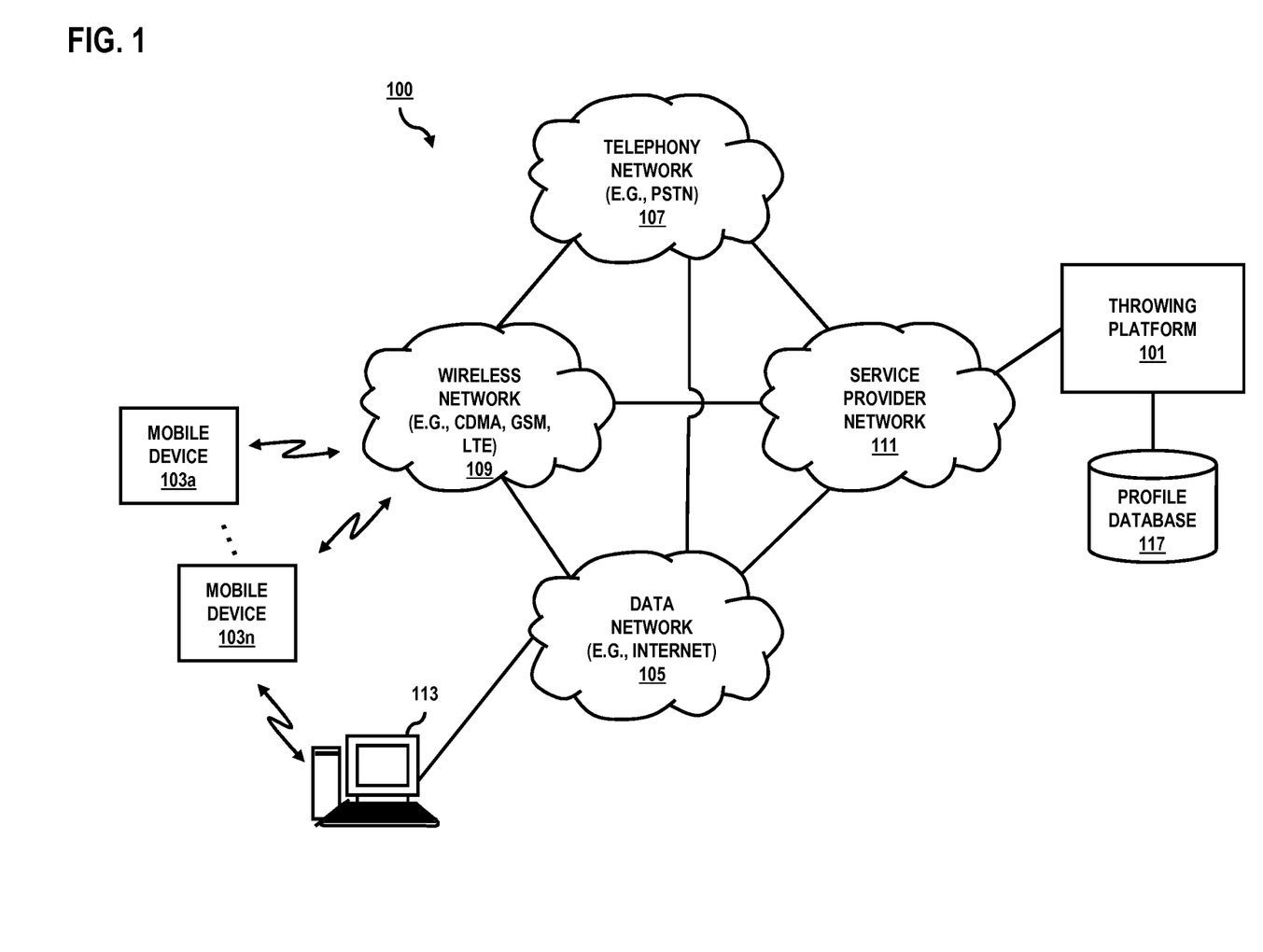
FIG. 1 is a diagram of a system capable of providing virtual throwing of objects, according to an exemplary embodiment.

FIG. 1 is a diagram of a system capable of providing virtual throwing of objects, according to an exemplary embodiment. For the purpose of illustration, the system 100 employs a throwing platform 101 that is configured to provide virtual throwing of objects as well as and virtual catching of such objects. The virtual throwing of objects may, for instance, be initiated using one or more user devices (e.g., mobile devices 103 (or mobile devices 103a-103n)) over one or more networks (e.g., data network 105, telephony network 107, wireless network 109, etc.). According to one embodiment, services including virtual throwing and catching of objects may be part of managed services supplied by a service provider (e.g., a wireless communication company) as a hosted or subscription-based service made available to users of the mobile devices 103 through a service provider network 111. As shown, the throwing platform 101 may be a part of or connected to the service provider network 111. According to another embodiment, the throwing platform 101 may be include within or connected to the mobile devices 103, a computer device 113, etc. While specific reference will be made thereto, it is contemplated that the system 100 may embody many forms and include multiple and/or alternative components and facilities. Throwing platform 101, in some embodiments, can provide effective game play and/or object delivery for players or other various users without the need to physically throw or catch such objects.

In certain embodiments, the throwing platform 101 may include or have access to an profile database 117. For example, the throwing platform 101 may access the profile database 117 to acquire profile information associated with one or more users of the mobile devices 103. Profile information may, for instance, include usernames, passwords, preference information, history information (e.g., associated with successful catches), and other information associated with the one or more users (e.g., name, address, phone number, email address, birth date, associated groups/networks, etc.).

As mentioned, recent developments have made certain activities that involve object throwing more indoor-friendly (e.g., with respect to a home). By way of example, these developments include polyurethane foam objects, such as foam footballs, volleyballs, baseballs, etc. As compared with a typical baseball, for instance, a foam baseball reduces the risk of damage associated with an indoor game of catch played inside the house. However, such foam objects may still cause damage to lighting and other devices within the home, for instance, when the foam objects are thrown with enough force. Delicate items, such as picture frames, mirrors, etc., are also prone to being damaged by physically-thrown objects. In addition, walls and other barriers within the home may hinder the playability of particular games since physical barriers can interfere with trajectories and catch areas of physically-thrown objects. Moreover, physical barriers may be an issue in many other circumstances, such as situations involving object delivery.

To address this issue, the system 100 of FIG. 1 introduces the capability to provide virtual throwing of objects. It is noted that although various embodiments are described with respect to games, it is contemplated that the approach described herein may be used in other situations associated with throwing and/or catching of objects. By way of example, the throwing platform 101 may detect execution of virtually throwing an object as represented by a first application on a first mobile device 103a. Upon detection, throwing data for the object may be determined using sensor information as well as location information of the first mobile device 103a. Sensor information may, for instance, be obtained by the throwing platform 101 and/or the mobile devices 103a-103n using a variety of technologies and techniques, such as a motion sensor, an accelerometer, and a compass as well as those of wireless fidelity (WiFi), near field communication (NFC), Bluetooth, or infrared techniques. Location information may also be determined using various technologies and techniques, including WiFi, NFC, Bluetooth, infrared, global positioning system (GPS), cell identification (ID), triangulation, etc. Additionally, or alternatively, the throwing data may include angle information, speed information, timing information, acceleration information, or a combination thereof, which may be determined using any combination of known technologies or techniques (including those described herein).

Using the throwing data along with location information associated with a second mobile device 103b, the throwing platform 101 may select the second mobile device 103b as a candidate to virtually catch the object as represented by a second application on the second mobile device 103b. Moreover, based on the throwing data and the location information associated with the second mobile device 103b, a successful catch of the object by the second mobile device 103b may be determined. In one use case, the first application may receive input from a user of the first mobile device 103a to form the throwing data, and the second application may receive input from a user of the second mobile device 103b to form catching data for determining the successful catch. It is noted that the first and second applications may be gaming applications and the users may be players. In this way, since users of the mobile devices 103 are virtually throwing and catching these objects, these users may avoid the need to physically throw objects, reducing damage risks associated with physically-thrown objects. Moreover, virtual throwing and catching may eliminate, or at least mitigate, interferences caused by walls and other physical barriers, as compared with physically-thrown objects.

By way of another example, the mobile device 103a may execute an application on the mobile device 103a to virtually throw the object, and generate throwing data using sensor information and location information of the mobile device 103a. The throwing data may then be transmitted to an application platform (e.g., the throwing platform 101) for selecting a candidate device to virtually catch the object based on the throwing data and the location information of the candidate device. Additionally, or alternatively, the object may be presented as an image on a display of the mobile device 103a. The following scenarios illustrate typical situations which the throwing platform 101 and/or the mobile devices 103 can be more effective in providing virtual throwing of objects.

In one scenario, there may be a downpour outside preventing several players from playing a game of football outside. As an alternative, the players may want to play a modified game of football inside the home, for instance, where the device (e.g., mobile device 103a) utilized as the football is not physically thrown from one player to another player. Thus, although the players may utilize a device resembling a typical football as the football, the device may include a safety wrist strap to keep the device attached to the throwing player if, or when, the device is physically thrown. In this way, the risk of damage to furniture, lighting, and other objects within the home may be minimized. The throwing player may, for instance, mimic throwing of the object to cause an execution of an application on the device to virtually throw the object.

In another scenario, a performer at a concert may want to excite her fans by "throwing" her pair of drumsticks into the crowd for her fans to catch. As such, the performer may virtually throw her pair of drumsticks into the crowd, for instance, by mimicking throwing of the drumsticks. In one use case, the drumsticks may include or interact with the mobile device 103a. As such, the application on the mobile device 103a may be executed to virtually throw the drumsticks based, for instance, on the mimicked throw. The mobile device 103a may use sensor information and location information of the mobile device 103a to generate throwing data and thereafter transmit the throwing data to an application platform (e.g., the throwing platform 101) for selecting one or more candidate devices in the crowd to virtually catch the drumsticks based on the throwing data and the location information of the candidate devices. In this case, since there are only two drumsticks, the number of selected candidate devices may be limited to two of the candidate devices in the crowd.

In certain embodiments, the throwing platform 101 may generate a notification message for transmission to the first application. By way of example, the notification message may specify the successful catch. Based on the notification message, the first application may thus indicate the successful catch to a user of the first mobile device 103a. The second application may also indicate the successful catch at the second mobile device 103b when, for instance, the object is virtually caught by a user of the second mobile device 103b. By way of another example, the notification message may also include contact information of the user of the second mobile device 103b. In one use case, a fan in the crowd who virtually catches one of the performer's drumsticks may have the actual drumstick mailed to her based on her contact information provided in the notification message to the first mobile device 103a.

It is noted that the mobile devices 103 may be any type of mobile terminal including a mobile handset, mobile station, mobile unit, multimedia computer, multimedia tablet, communicator, netbook, Personal Digital Assistants (PDAs), smartphone, media receiver, etc. It is also contemplated that the mobile devices 103 may support any type of interface for supporting the presentment or exchange of data. In addition, mobile devices 103 may facilitate various input means for receiving and generating information, including touch screen capability, keyboard and keypad data entry, voice-based input mechanisms, accelerometer (e.g., shaking the mobile device 103), and the like. Any known and future implementations of mobile devices 103 are applicable. It is noted that, in certain embodiments, the mobile devices 103 may be configured to establish peer-to-peer communication sessions with each other using a variety of technologies—i.e., near field communication (NFC), Bluetooth, infrared, etc. Also, connectivity may be provided via a wireless local area network (LAN). By way of example, a group of mobile devices 103 may be configured to a common LAN so that each device can be uniquely identified via any suitable network addressing scheme. For example, the LAN may utilize the dynamic host configuration protocol (DHCP) to dynamically assign "private" DHCP internet protocol (IP) addresses to each mobile device 103, i.e., IP addresses that are accessible to devices connected to the service provider network 111 as facilitated via a router.

In various embodiments, the throwing platform 101 may track a number of successful catches by a plurality of mobile devices 103 that have been selected as candidates. By way of example, the number of successful catches by the various mobile devices 103 may be tracked to determine the outcome of a particular game. In the game, for instance, the team of players associated with the highest number of successful catches may be determined to be the winning team. By way of another example, the number of successful catches by the various mobile devices 103 may be tracked to determine how many more candidates may be selected to successful catch the object (e.g., rewards, offers, coupons, etc.). In one scenario, a promoter at a sports game may set a maximum threshold for the number of promotional T-shirts that can be given out. As such, because the tracking of the number of successful catches will enable the promoter's user device to prevent the promoter from throwing more than the maximum threshold, the promoter may continue to virtually throw T-shirts (e.g., one T-shirt at a time, multiple T-shirts at a time, etc.) into sections of the crowd without having to worry that she will give out too many T-shirts.

In certain embodiments, the throwing platform 101 may attribute a reward point to the second mobile device 103*b* for the successful catch. In one use case, the reward points may be utilized to encourage consumers to shop at a particular mall. Managers and sales associates may, for instance, virtually throw "reward" balls out into a crowd of consumers. For every successful catch, a consumer may be given reward points. The accumulated reward points may then be used to purchase items, discounts associated with items, etc., in the mall.

In other embodiments, the throwing platform 101 may determine trajectory data for the object using the throwing data. By way of example, the trajectory data may include information relating to a path that the object would follow through space as a function of time if, for instance, the object was physically thrown. Once determined, the trajectory data may then be used to select the candidate for the successful catch.

In further embodiments, the throwing platform 101 may define a catch area associated with the second mobile device 103*b* and a user of the second mobile device 103*b*. In one scenario, a number of objects may be virtually thrown. Multiple catch areas may be then determined and associated with various mobile devices 103*a*-103*n* along with their respective users. One or more successful catches of the objects by the various mobile devices 103*a*-103*n* may thereafter be determined based on which of the defined catch areas the objects land based on the throwing data, the trajectory data, location information, etc.

In some embodiments, the throwing platform 101, the mobile devices 103, and other elements of the system 100 may be configured to communicate via the service provider network 111. According to certain embodiments, one or more networks, such as the data network 105, the telephony network 107, and/or the wireless network 109, may interact with the service provider network 111. The networks 105-109 may be any suitable wireline and/or wireless network, and be managed by one or more service providers. For example, the data network 105 may be any local area network (LAN), metropolitan area network (MAN), wide area network (WAN), the Internet, or any other suitable packet-switched network, such as a commercially owned, proprietary packet-switched network, such as a proprietary cable or fiber-optic network. The telephony network 107 may include a circuit-switched network, such as the public switched telephone network (PSTN), an integrated services digital network (ISDN), a private branch exchange (PBX), or other like network. Meanwhile, the wireless network 109 may employ various technologies including, for example, code division multiple access (CDMA), long term evolution (LTE), enhanced data rates for global evolution (EDGE), general packet radio service (GPRS), mobile ad hoc network (MA-NET), global system for mobile communications (GSM), Internet protocol multimedia subsystem (IMS), universal mobile telecommunications system (UMTS), etc., as well as any other suitable wireless medium, e.g., microwave access (WiMAX), wireless fidelity (WiFi), satellite, and the like.

Although depicted as separate entities, the networks 105-109 may be completely or partially contained within one another, or may embody one or more of the aforementioned infrastructures. For instance, the service provider network 111 may embody circuit-switched and/or packet-switched networks that include facilities to provide for transport of circuit-switched and/or packet-based communications. It is further contemplated that the networks 105-109 may include components and facilities to provide for signaling and/or bearer communications between the various components or facilities of the system 100. In this manner, the networks 105-109 may embody or include portions of a signaling system 7 (SS7) network, Internet protocol multimedia subsystem (IMS), or other suitable infrastructure to support control and signaling functions.

Figure 2:
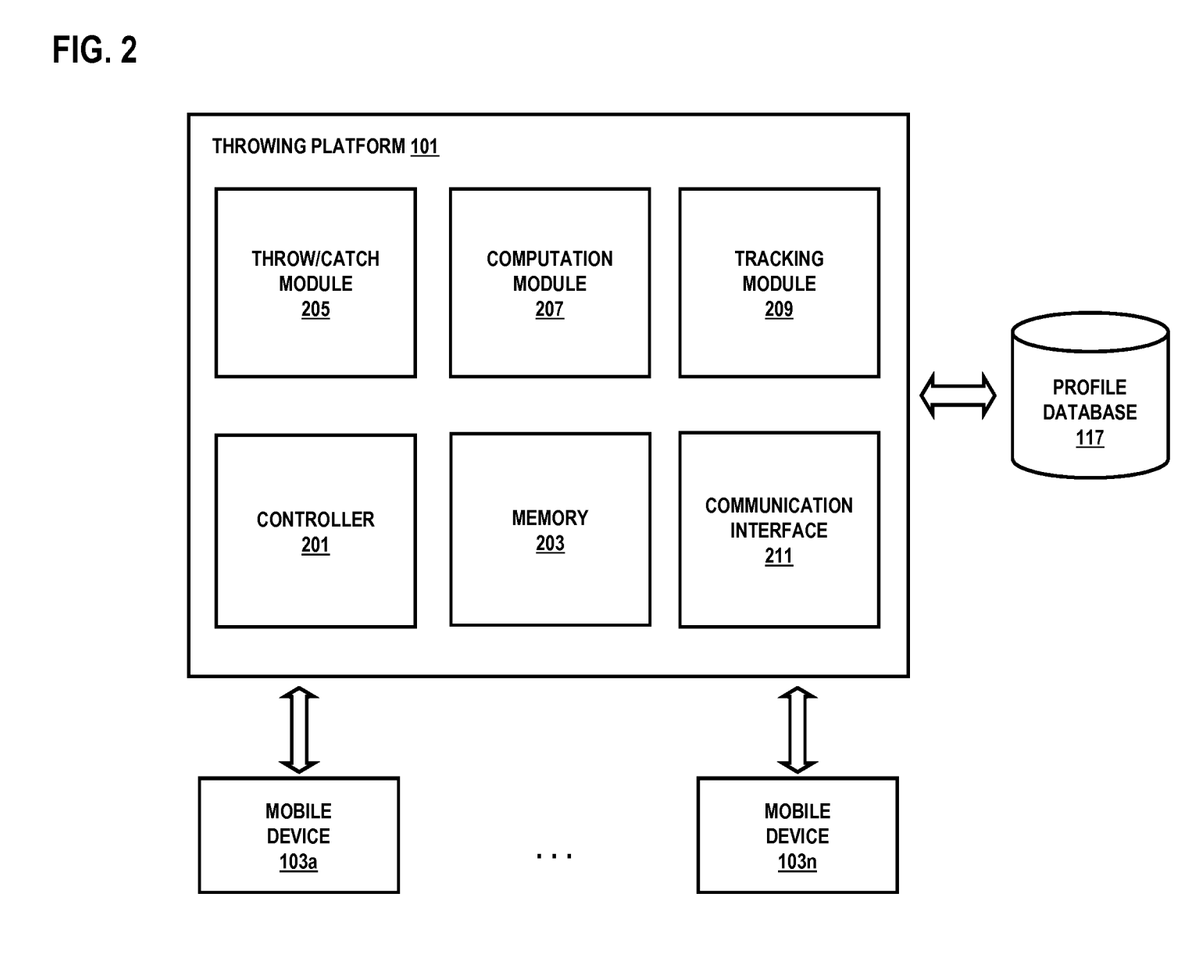
FIG. 2 is a diagram of the components of a throwing platform, according to an exemplary embodiment.

FIG. 2 is a diagram of the components of a throwing platform, according to an exemplary embodiment. The throwing platform 101 may comprise computing hardware (such as described with respect to FIG. 9), as well as include one or more components configured to execute the processes described herein for providing coded access services of the system 100. It is contemplated that the functions of these components may be combined in one or more components or performed by other components of equivalent functionality. In one implementation, the throwing platform 101 includes a controller (or processor) 201, memory 203, a throw/catch module 205, a computation module 207, a tracking module 209, and a communication interface 211.

The controller 201 may execute at least one algorithm for executing functions of the throwing platform 101. For example, the controller 201 may interact with the throw/catch module 205 to detect execution of virtually throwing an object as represented by a first application on the first mobile device 103*a*. The throw/catch module 205 may then obtain sensor information, location information of the first mobile device 103*a*, and location information of the second mobile device 103*b*. As discussed, sensor information may be obtained by using a variety of technologies and techniques, such as a motion sensor, an accelerometer, and a compass as well as those of WiFi, NFC, Bluetooth, or infrared techniques. Location information may also be determined using various technologies and techniques, including WiFi, NFC, Bluetooth, infrared, GPS, cell ID, triangulation, etc.

The throw/catch module 205 may work with the computation module 207 to determine the throwing data based on the sensor information and the location information of the mobile device 103*a*. The first application may, for instance, receive input from a user of the first mobile device 103*a* for forming the throwing data. As mentioned, the throwing data may additionally, or alternatively, include angle information, speed information, timing information, and/or acceleration information, which may be determined using any combination of known technologies or techniques. The computation module 207 may then select the second mobile device 103*b* as a candidate to virtually catch the object as represented by a second application on the second mobile device 103*b* based on the throwing data and the location information of the second mobile device 103*b*. The second application may, for instance, receive input from a user of the second mobile device 103*b* for forming catching data. The throw/catch module 205 and the computation module 207 may thereafter determine a successful catch of the object by the second mobile device 103b, for instance, based on the throwing data, the location information of the second mobile device 103b, the catching data, or other relevant information (e.g., trajectory data, defined catch area, etc.).

The controller 201 may then direct the throw/catch module 205 to generate a notification message, including information specifying the successful catch, to the first application and/or to the second application to indicate the successful catch at the second mobile device 103b. The controller 201 may also work with the tracking module 209 to track the number of successful catches by various mobile devices 103a-103n that may have been selected as candidates (e.g., for the objects previously thrown). Additionally, or alternatively, the tracking module 209 may attribute one or more rewards points to the second mobile device 103b for the successful catch.

The controller 201 may further utilize the communication interface 211 to communicate with other components of the throwing platform 101, the mobile devices 103, and other components of the system 100. The communication interface 211 may include multiple means of communication. For example, the communication interface 211 may be able to communicate over short message service (SMS), multimedia messaging service (MMS), internet protocol, instant messaging, voice sessions (e.g., via a phone network), email, or other types of communication. By way of example, such methods may be used to initiate transmission of the generated notification messages to the first and second applications of the respective first and second mobile devices 103a and 103b.

Figure 3:
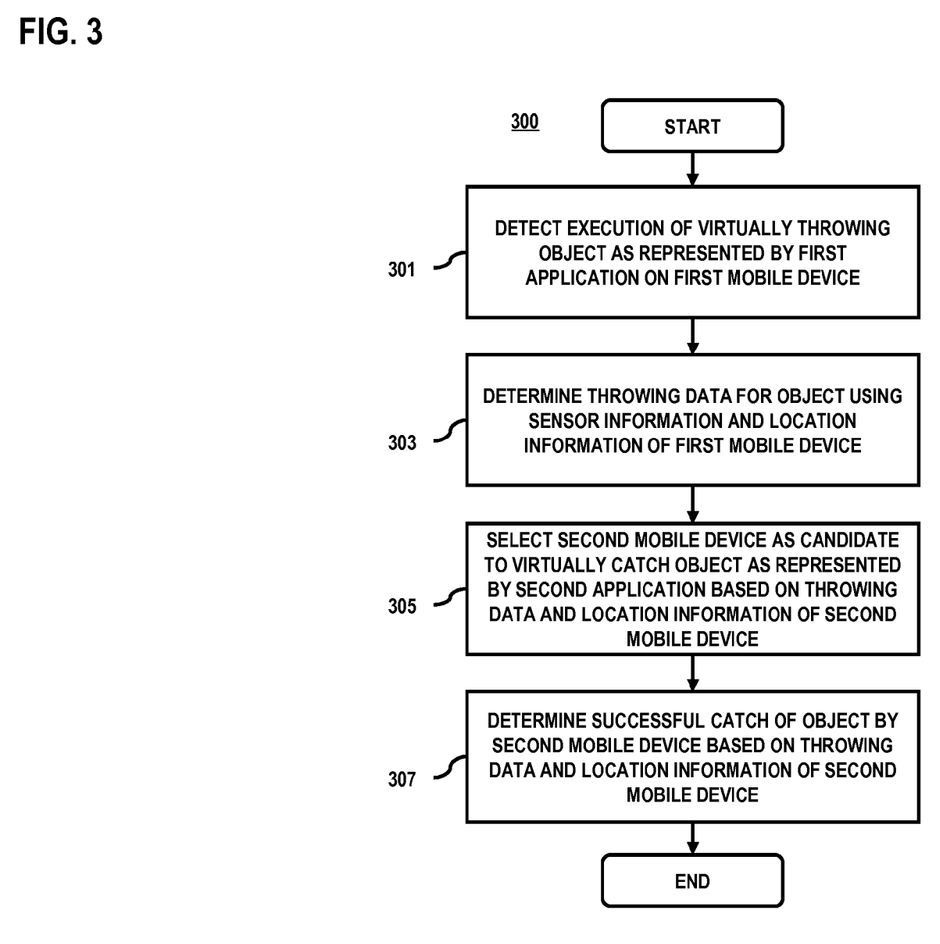
FIG. 3 is a flowchart of a process for providing virtual throwing of objects, according to an exemplary embodiment.

FIG. 3 is a flowchart of a process for providing virtual throwing of objects, according to an exemplary embodiment. For the purpose of illustration, process 300 is described with respect to FIG. 1. It is noted that the steps of the process 300 may be performed in any suitable order, as well as combined or separated in any suitable manner. In step 301, the throwing platform 101 may detect execution of virtually throwing an object as represented by a first application on a first mobile device 103a. The throwing platform 101 may then, as in step 303, determine throwing data for the object using sensor information and location information of the first mobile device 103a. By way of example, the sensor information may be obtained using a variety of technologies and techniques, such as a motion sensor, an accelerometer, a compass, as well as those of WiFi, NFC, Bluetooth, or infrared techniques. Location information may also be determined using various technologies and techniques, including WiFi, NFC, Bluetooth, infrared, GPS, cell ID, triangulation, etc. As mentioned, the throwing data may additionally, or alternatively, include angle information, speed information, timing information, and/or acceleration information, which may be determined using any combination of known technologies or techniques.

In step 305, the throwing platform 101 may select a second mobile device 103b as a candidate to virtually catch the object as represented by a second application on the second mobile device 103b based on the throwing data and location information of the second mobile device 103b. Once the candidate is selected, the throwing platform 101 may, as in step 307, determine a successful catch of the object by the second mobile device 103b based on the throwing data and the location information of the second mobile device 103b. It is noted that, in some circumstances, a particular mobile device selected as a candidate may not be determined to successfully catch the object (e.g., a candidate initially within the catch area may leave the catch area before the object become "catchable"). As indicated, virtual throwing and catching of objects, as compared with physically thrown-objects, reduces risks of damage as well as interferences caused by walls and other physical barriers.

Figure 4:
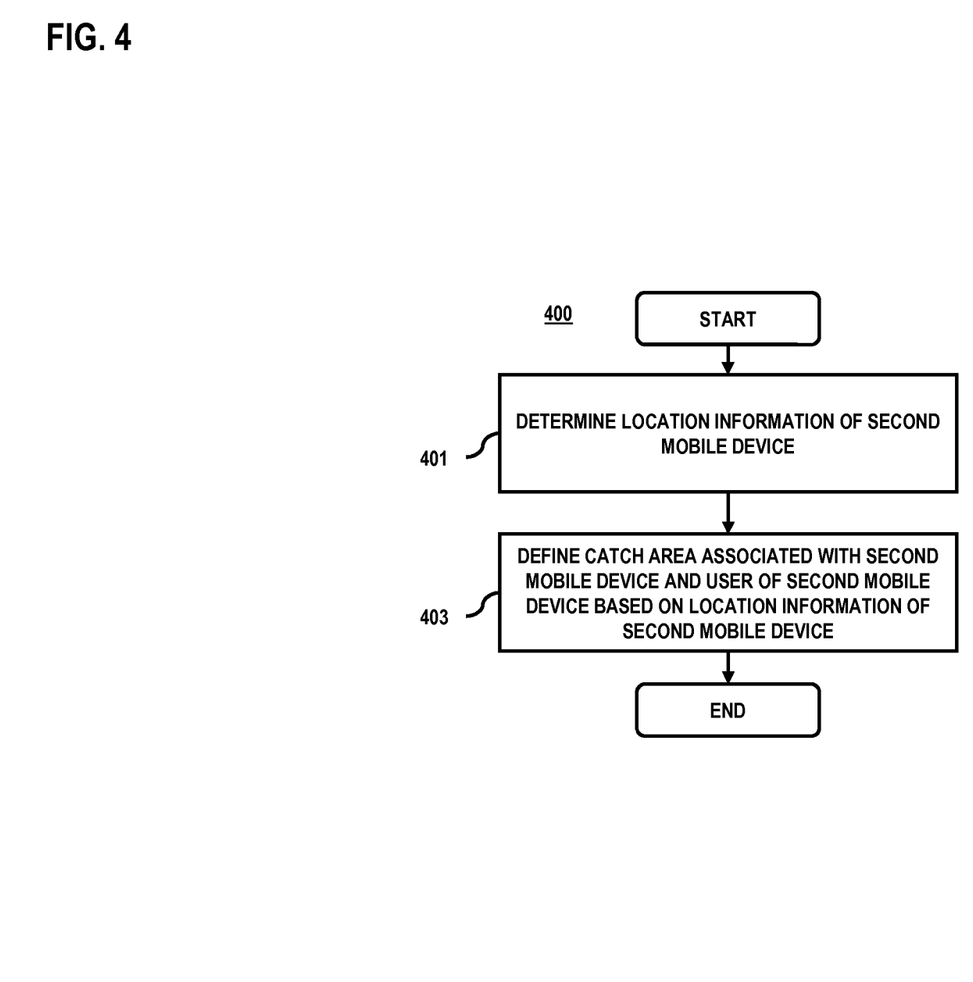
FIG. 4 is a flowchart of a process for defining a catch area, according to an exemplary embodiment.

FIG. 4 is a flowchart of a process for defining a catch area, according to an exemplary embodiment. For the purpose of illustration, process 400 is described with respect to FIG. 1. It is noted that the steps of the process 400 may be performed in any suitable order, as well as combined or separated in any suitable manner. In step 401, the throwing platform 101 may determine location information of the second mobile device 103b as well as the location information associated with other mobile devices 103c-103n. The throwing platform 101 may then, as in step 403, define a catch area associated with the second mobile device 103b and a user of the second mobile device 103b based on the location information of the second mobile device 103b. Similarly, the throwing platform 101 may define other catch areas associated with other mobile devices 103c-103n and other users of the mobile devices 103c-103n based on their respective location information. By way of example, after the catch areas are defined, they may be utilized by the throwing platform 101 to select the candidates to virtually catch the virtually-thrown object.

Figure 5:
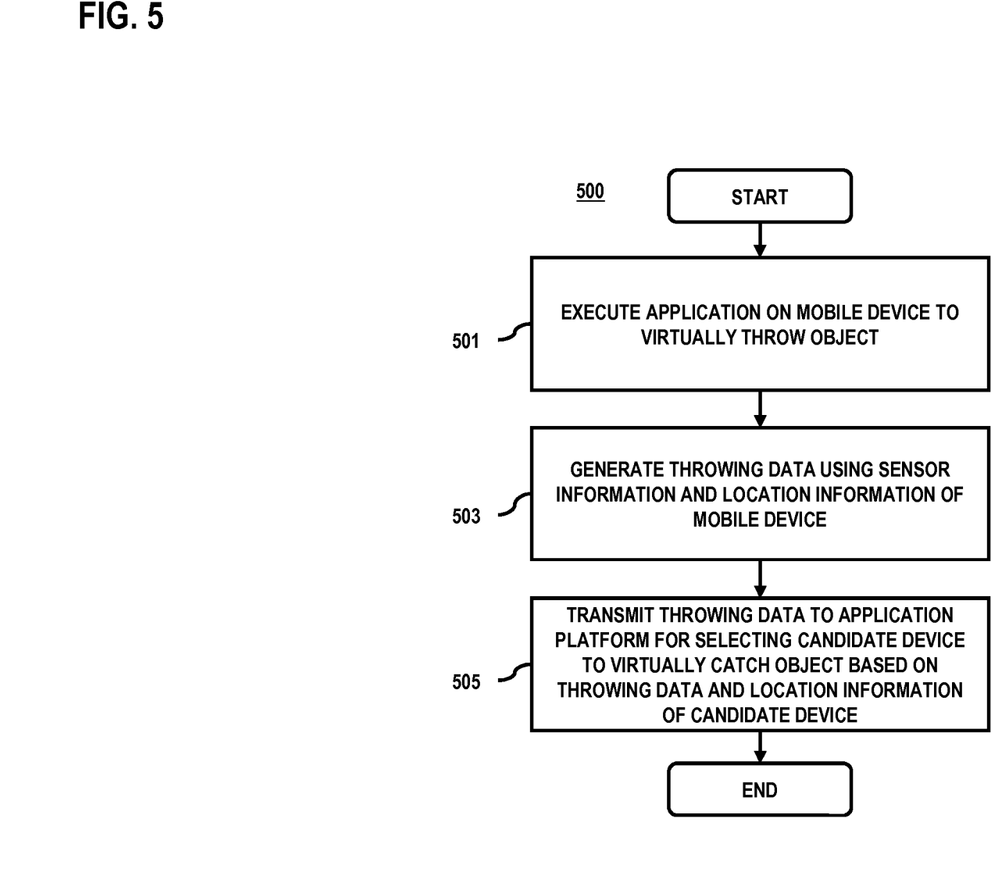
FIG. 5 is a flowchart of a process for virtually throwing objects using a mobile device, according to an exemplary embodiment.

FIG. 5 is a flowchart of a process for virtually throwing objects using a mobile device, according to an exemplary embodiment. For the purpose of illustration, process 500 is described with respect to FIG. 1. It is noted that the steps of the process 500 may be performed in any suitable order, as well as combined or separated in any suitable manner. In step 501, the mobile device 103a may execute an application on the mobile device 103a to virtually throw an object. As discussed, the object may be presented as an image on a display of the mobile device 103a, for instance, upon the virtual throwing of the object.

The mobile device 103a may then, as in step 503, generate throwing data using sensor information and location information of the mobile device 103a. As discussed, the sensor information as well as any location information may be obtained using a variety of technologies and techniques, including those described herein. In step 505, the mobile device 103a may transmit the throwing data to an application platform, such as the throwing platform 101, for selecting a candidate device to virtually catch the object based on the throwing data and location information of the candidate device. It is noted, however, that the mobile device 103a and other mobile devices 103b-103n may be part of a peer-to-peer network and interact with each other over such networks. As discussed, the mobile devices 103a-103n may include or be connected to the throwing platform 101. Therefore, the mobile devices 103a-103n may also virtually throw and catch objects according with the system 100 without the need for a central infrastructure.

Figure 6:
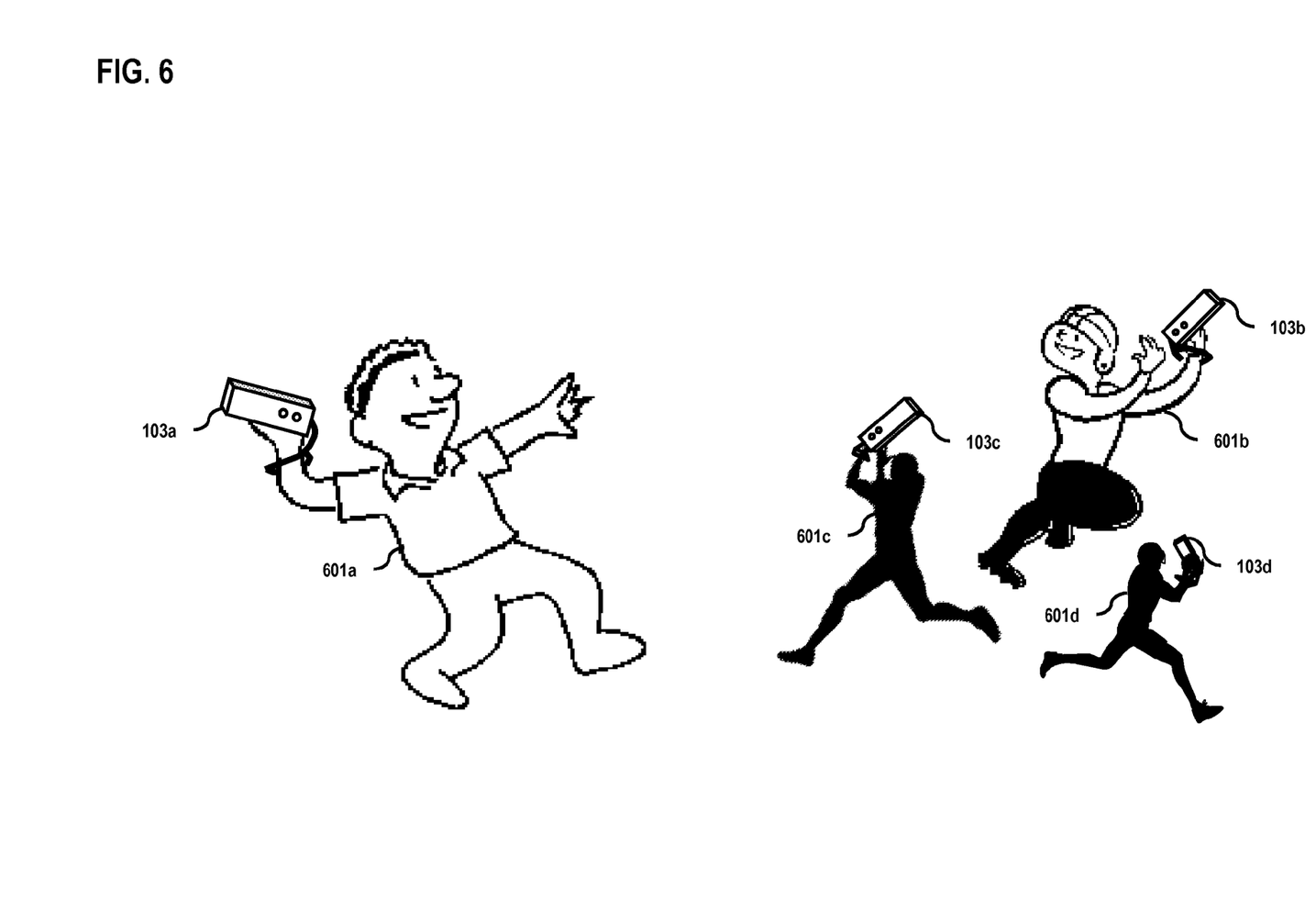
FIG. 6 is a diagram of a use case for a game relating to virtual throwing of objects, according to an exemplary embodiment.

FIG. 6 is a diagram of a use case for a game relating to virtual throwing of objects, according to an exemplary embodiment. For illustrative purposes, the diagram is described with reference to the system 100 of FIG. 1. As shown, the diagram features mobile devices 103a-103d and associated users 601a-601d. The mobile devices 103a-103d each have a safety wrist strap attached to the respective users 601a-601d to prevent injury to the users 601a-601 or damage to objects within the home, for instance, if any of the mobile devices 103a-103d are accidentally physically thrown. In this scenario, the mobile devices 103a-103d include respective gaming applications to virtually throw and catch an object representing a football for a particular indoor football game and the users 601a-601d are players of the indoor football game. User 601a is currently the throwing player and users 601b-601d are currently the catching players.

In a peer-to-peer network arrangement, for instance, the mobile device of the throwing player (e.g., mobile device 103a) may act as the host, including or having access to the throwing platform 101. As such, the mobile devices 103a-103d may interact with each other over peer-to-peer signals (e.g., wireless peer-to-peer signals). Thus, the mobile device 103a may, via the throwing platform 101, determine throwing data for the football based on sensor information and location information of the mobile device 103a after detecting the virtual throwing of the football as represented by a first application on the mobile device 103a. One of the mobile devices 103b-103d may be selected as a candidate to virtually catch the football as represented by a second application on the selected mobile device based on the throwing data and location information of the respective mobile devices 103b-103d. A successful virtual catch by the selected mobile device may thereafter be determined based on the throwing data and the location information of the respective mobile devices 103b-103b. As an example, if mobile device 103b is selected as a candidate, the throwing data and the location information of the mobile device 103b will be further utilized to determine whether the football is successful caught by the mobile device 103b.

Figure 7A:
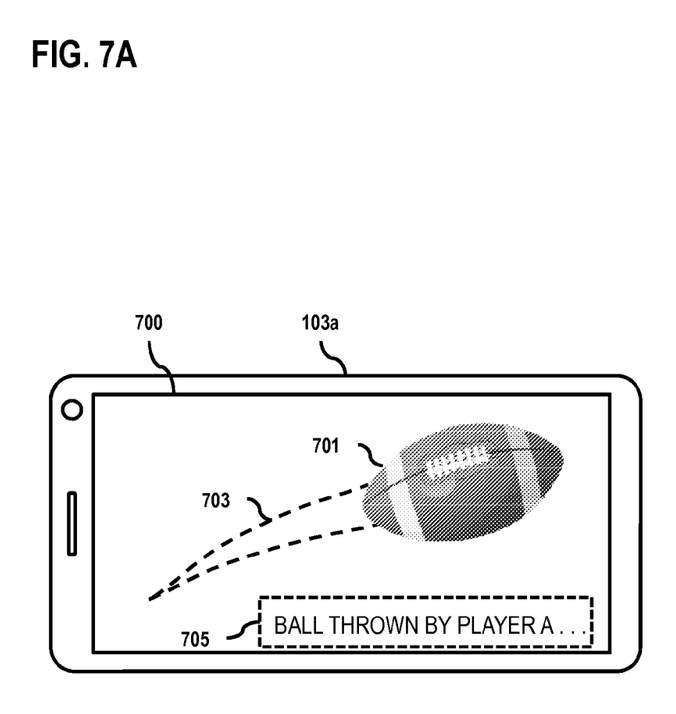
FIGS. 7A and 7B are diagrams of a user interface for virtual throwing of objects, according to various exemplary embodiments.
Figure 7B:
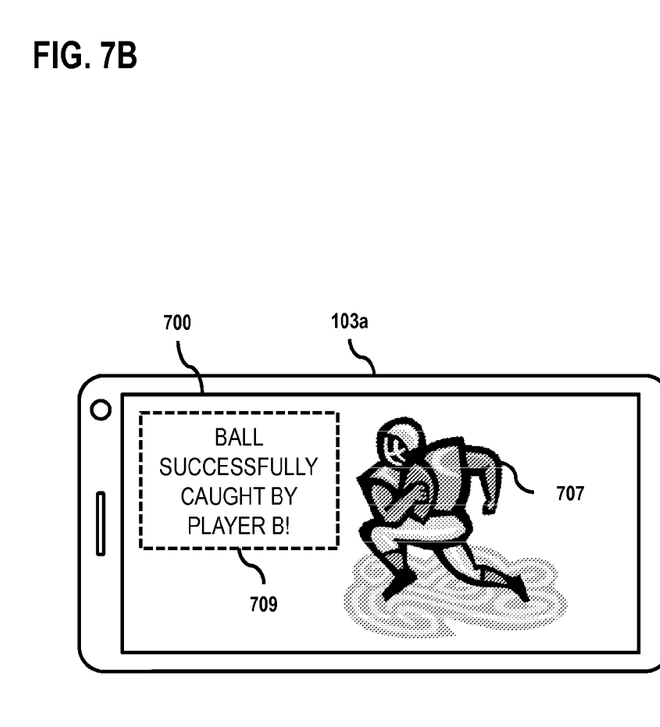

FIGS. 7A and 7B are diagrams of a user interface for virtual throwing of objects, according to various exemplary embodiments. For illustrative purposes, the diagrams are described with reference to the system 100 of FIG. 1. For instance, FIG. 7A is a diagram of the mobile device 103a with the user interface 700 featuring an image 701 of the football being thrown, a representation 703 of the trajectory of the football, and a notification message 705 specifying that the football associated with the image 701 has been virtually thrown by Player A. In FIG. 7B, the image 707 depicts Player B catching the football and the notification message 709 indicates to Player A, via the mobile device 103a, that the football has been successfully caught virtually by Player B (e.g., mobile device 103b).

It is noted that the features of the user interface 700 may also be presented on the corresponding user interfaces of the other mobile devices (e.g., mobile devices 103b-103d). As discussed, in a peer-to-peer network arrangement, the mobile devices 103a-103d may interact with each other over peer-to-peer signals. By way of example, the mobile device 103a may transmit a notification message to the other mobile devices 103b-103d to indicate that the football has been thrown by Player A. When it is determined that the football has been caught, for instance, by Player B, the mobile device 103a may transmit another notification message to indicate that Player B has caught the football. Additionally, or alternatively, the mobile device 103b (associated with Player B) may transmit a notification message to the other mobile devices 103a, 103c, and 103d to indicate that Player B has caught the football.

Figure 8:
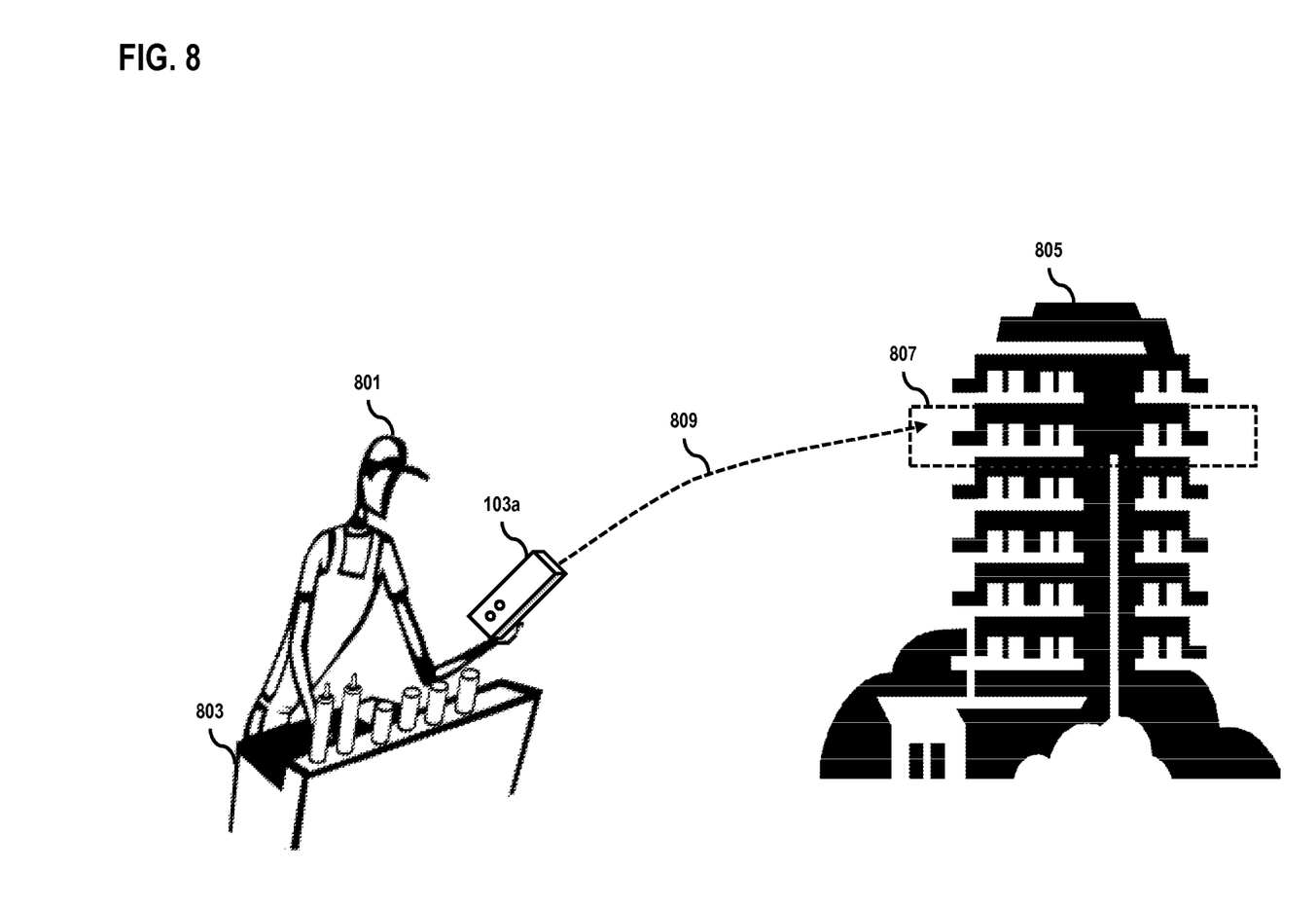
FIG. 8 is a diagram of a use case for coupon delivery relating to virtual throwing of objects, according to an exemplary embodiment.

FIG. 8 is a diagram of a use case for coupon delivery relating to virtual throwing of objects, according to an exemplary embodiment. For illustrative purposes, the diagram is described with reference to the system 100 of FIG. 1. As shown, the food vendor 801 has a food cart 803 outside of the building 805. To attract customers from a particular floor 807 of the building 805, the food vendor 801 may use his mobile device 103a to virtually throw, at the floor 807, coupons for various items that the food vendor 801 sells. As indicated, because the coupons are virtually thrown, the building walls and windows will not prevent the coupons from being virtually caught by users on the floor 807, or be damaged by the thrown coupons.

The mobile device 103a may generate the throwing data based on available sensor information and its associated location information. The throwing data may then be transmitted to the throwing platform 101 to select one or more candidate devices to virtually catch the coupons. Using the throwing data, the throwing platform 101 may determine a trajectory 809 for the coupons. In this scenario, since the food vendor 801 has aimed the coupons at the floor 807, the coupons may land in a defined catch area associated with certain mobile devices 103b-103n on the floor 807. Because the food vendor 801 may want to limit the number of coupons caught, the number of coupons associated with the virtual throw (e.g., an X number of coupons for each virtual throw) may be predetermined, for instance, by the user. Accordingly, the throwing platform 101 may track the number of successful catches by the various mobile devices 103b-103n within the catch area. As such, when the predetermined limit for the throw has been reached, further coupons associated with the particular throw may not be caught. In a further scenario, however, a user of mobile device 103b who has caught a coupon may give her coupon away to another user by using the mobile device 103b to virtually throw her coupon to the other user's mobile device (e.g., one of the other mobile device 103c-103n).

In a further scenario, the food vendor 801 may offer premium coupons to exclusive members associated with his food cart 803, for instance, members associated with a social network of the food vendor 801. Thus, if the food vendor 801 is throwing these premium coupons to floor 807 of the building 805, only the mobile devices 103b-103n associated with users who are part of the particular social network may be selected as candidates to virtually catch the premium coupons. As such, the selection of the candidates and, thus, the successful catch of the object may be based on one or more social groups, such as the social group associated with the food vendor 801.

The processes described herein for providing virtual throwing of objects may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 9:
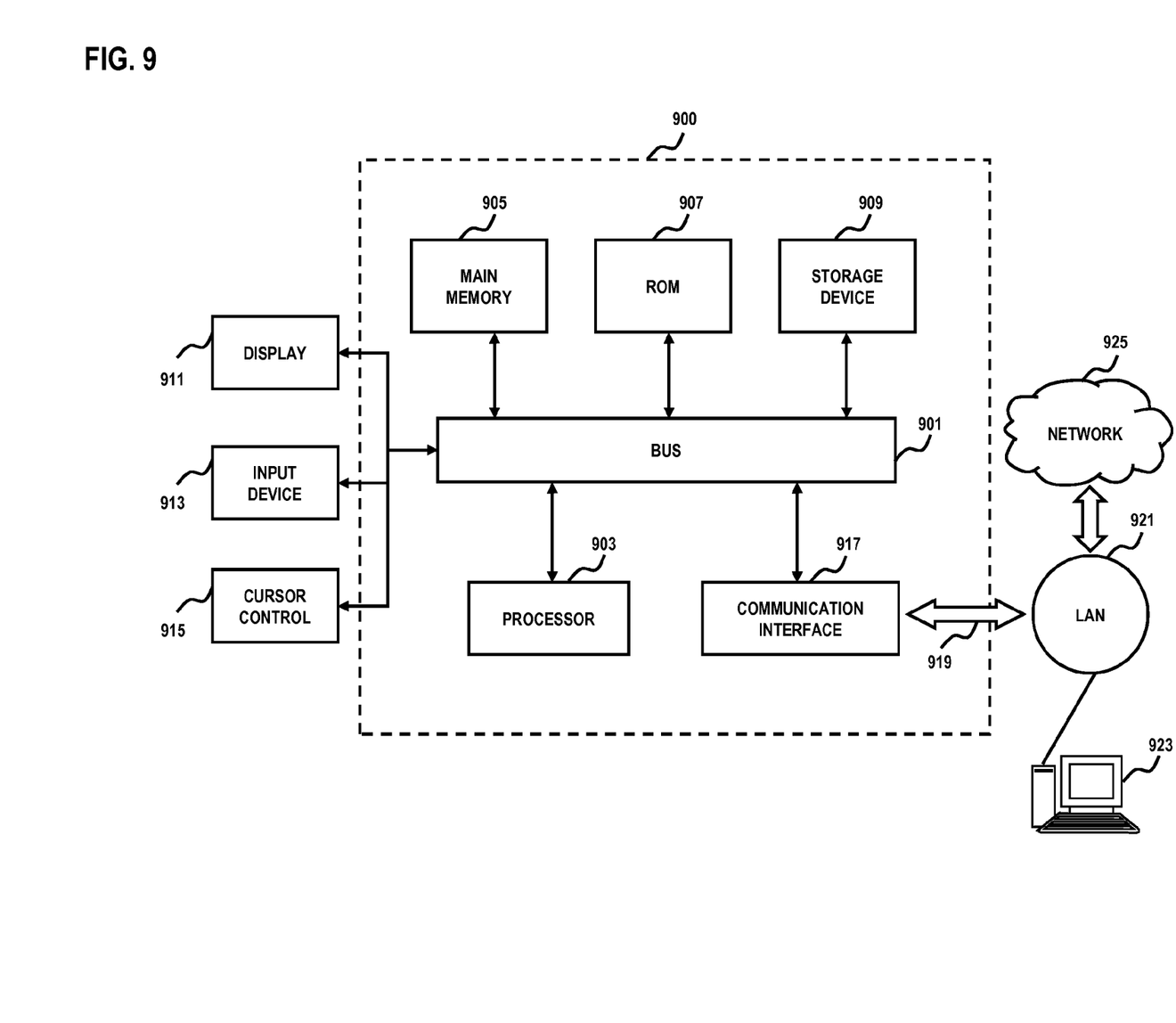
FIG. 9 is a diagram of a computer system that can be used to implement various exemplary embodiments.

FIG. 9 is a diagram of a computer system that can be used to implement various exemplary embodiments. The computer system 900 includes a bus 901 or other communication mechanism for communicating information and one or more processors (of which one is shown) 903 coupled to the bus 901 for processing information. The computer system 900 also includes main memory 905, such as a random access memory (RAM) or other dynamic storage device, coupled to the bus 901 for storing information and instructions to be executed by the processor 903. Main memory 905 can also be used for storing temporary variables or other intermediate information during execution of instructions by the processor 903. The computer system 900 may further include a read only memory (ROM) 907 or other static storage device coupled to the bus 901 for storing static information and instructions for the processor 903. A storage device 909, such as a magnetic disk, flash storage, or optical disk, is coupled to the bus 901 for persistently storing information and instructions.

The computer system 900 may be coupled via the bus 901 to a display 911, such as a cathode ray tube (CRT), liquid crystal display, active matrix display, or plasma display, for displaying information to a computer user. Additional output mechanisms may include haptics, audio, video, etc. An input device 913, such as a keyboard including alphanumeric and other keys, is coupled to the bus 901 for communicating information and command selections to the processor 903. Another type of user input device is a cursor control 915, such as a mouse, a trackball, touch screen, or cursor direction keys, for communicating direction information and command selections to the processor 903 and for adjusting cursor movement on the display 911.

According to an embodiment of the invention, the processes described herein are performed by the computer system 900, in response to the processor 903 executing an arrangement of instructions contained in main memory 905. Such instructions can be read into main memory 905 from another computer-readable medium, such as the storage device 909. Execution of the arrangement of instructions contained in main memory 905 causes the processor 903 to perform the process steps described herein. One or more processors in a multi-processing arrangement may also be employed to execute the instructions contained in main memory 905. In alternative embodiments, hard-wired circuitry may be used in place of or in combination with software instructions to implement the embodiment of the invention. Thus, embodiments of the invention are not limited to any specific combination of hardware circuitry and software.

The computer system 900 also includes a communication interface 917 coupled to bus 901. The communication interface 917 provides a two-way data communication coupling to a network link 919 connected to a local network 921. For example, the communication interface 917 may be a digital subscriber line (DSL) card or modem, an integrated services digital network (ISDN) card, a cable modem, a telephone modem, or any other communication interface to provide a data communication connection to a corresponding type of communication line. As another example, communication interface 917 may be a local area network (LAN) card (e.g. for Ethernet™ or an Asynchronous Transfer Mode (ATM) network) to provide a data communication connection to a compatible LAN. Wireless links can also be implemented. In any such implementation, communication interface 917 sends and receives electrical, electromagnetic, or optical signals that carry digital data streams representing various types of information. Further, the communication interface 917 can include peripheral interface devices, such as a Universal Serial Bus (USB) interface, a PCMCIA (Personal Computer Memory Card International Association) interface, etc. Although a single communication interface 917 is depicted in FIG. 9, multiple communication interfaces can also be employed.

The network link 919 typically provides data communication through one or more networks to other data devices. For example, the network link 919 may provide a connection through local network 921 to a host computer 923, which has connectivity to a network 925 (e.g. a wide area network (WAN) or the global packet data communication network now commonly referred to as the "Internet") or to data equipment operated by a service provider. The local network 921 and the network 925 both use electrical, electromagnetic, or optical signals to convey information and instructions. The signals through the various networks and the signals on the network link 919 and through the communication interface 917, which communicate digital data with the computer system 900, are exemplary forms of carrier waves bearing the information and instructions.

The computer system 900 can send messages and receive data, including program code, through the network(s), the network link 919, and the communication interface 917. In the Internet example, a server (not shown) might transmit requested code belonging to an application program for implementing an embodiment of the invention through the network 925, the local network 921 and the communication interface 917. The processor 903 may execute the transmitted code while being received and/or store the code in the storage device 909, or other non-volatile storage for later execution. In this manner, the computer system 900 may obtain application code in the form of a carrier wave.

The term "computer-readable medium" as used herein refers to any medium that participates in providing instructions to the processor 903 for execution. Such a medium may take many forms, including but not limited to computer-readable storage medium ((or non-transitory)—i.e., non-volatile media and volatile media), and transmission media. Non-volatile media include, for example, optical or magnetic disks, such as the storage device 909. Volatile media include dynamic memory, such as main memory 905. Transmission media include coaxial cables, copper wire and fiber optics, including the wires that comprise the bus 901. Transmission media can also take the form of acoustic, optical, or electromagnetic waves, such as those generated during radio frequency (RF) and infrared (IR) data communications. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Various forms of computer-readable media may be involved in providing instructions to a processor for execution. For example, the instructions for carrying out at least part of the embodiments of the invention may initially be borne on a magnetic disk of a remote computer. In such a scenario, the remote computer loads the instructions into main memory and sends the instructions over a telephone line using a modem. A modem of a local computer system receives the data on the telephone line and uses an infrared transmitter to convert the data to an infrared signal and transmit the infrared signal to a portable computing device, such as a personal digital assistant (PDA) or a laptop. An infrared detector on the portable computing device receives the information and instructions borne by the infrared signal and places the data on a bus. The bus conveys the data to main memory, from which a processor retrieves and executes the instructions. The instructions received by main memory can optionally be stored on storage device either before or after execution by processor.

Figure 10:
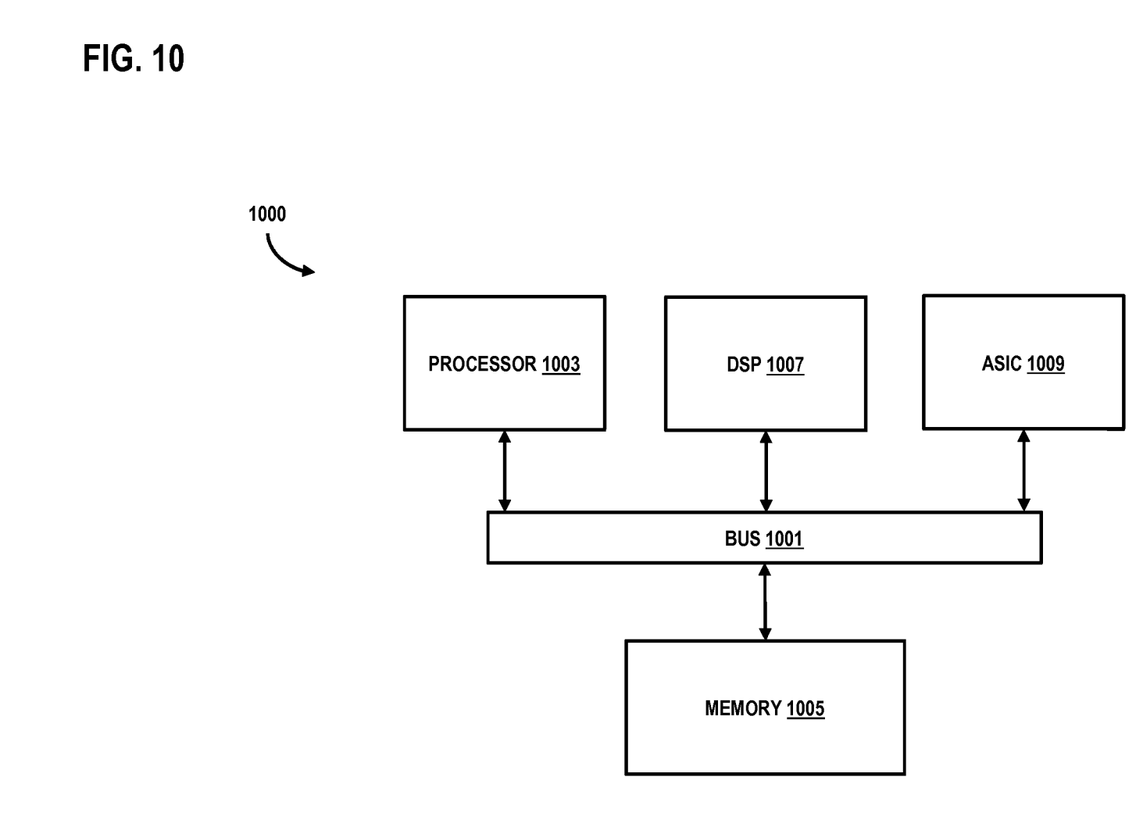
FIG. 10 is a diagram of a chip set that can be used to implement an embodiment of the invention.

FIG. 10 illustrates a chip set or chip 1000 upon which an embodiment of the invention may be implemented. Chip set 1000 is programmed to enable virtual throwing of objects as described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 1000 can be implemented in a single chip. It is further contemplated that in certain embodiments the chip set or chip 1000 can be implemented as a single "system on a chip." It is further contemplated that in certain embodiments a separate ASIC would not be used, for example, and that all relevant functions as disclosed herein would be performed by a processor or processors. Chip set or chip 1000, or a portion thereof, constitutes a means for performing one or more steps of enabling virtual throwing of objects.

In one embodiment, the chip set or chip 1000 includes a communication mechanism such as a bus 1001 for passing information among the components of the chip set 1000. A processor 1003 has connectivity to the bus 1001 to execute instructions and process information stored in, for example, a memory 1005. The processor 1003 may include one or more processing cores with each core configured to perform independently. A multi-core processor enables multiprocessing within a single physical package. Examples of a multi-core processor include two, four, eight, or greater numbers of processing cores. Alternatively or in addition, the processor 1003 may include one or more microprocessors configured in tandem via the bus 1001 to enable independent execution of instructions, pipelining, and multithreading. The processor 1003 may also be accompanied with one or more specialized components to perform certain processing functions and tasks such as one or more digital signal processors (DSP) 1007, or one or more application-specific integrated circuits (ASIC) 1009. A DSP 1007 typically is configured to process real-world signals (e.g., sound) in real time independently of the processor 1003. Similarly, an ASIC 1009 can be configured to performed specialized functions not easily performed by a more general purpose processor. Other specialized components to aid in performing the inventive functions described herein may include one or more field programmable gate arrays (FPGA) (not shown), one or more controllers (not shown), or one or more other special-purpose computer chips.

In one embodiment, the chip set or chip 1000 includes merely one or more processors and some software and/or firmware supporting and/or relating to and/or for the one or more processors.

The processor 1003 and accompanying components have connectivity to the memory 1005 via the bus 1001. The memory 1005 includes both dynamic memory (e.g., RAM, magnetic disk, writable optical disk, etc.) and static memory (e.g., ROM, CD-ROM, etc.) for storing executable instructions that when executed perform the inventive steps described herein to enable virtual throwing of objects. The memory 1005 also stores the data associated with or generated by the execution of the inventive steps.

While certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A method comprising:
   detecting, via a processor, execution of virtually throwing an object as represented by a first application on a first mobile device, wherein an intended recipient of the object is unknown to the first mobile device at the time of virtually throwing the object;
   determining, via the processor, at the time of the virtually throwing the object, throwing data for the object using sensor information and location information of the first mobile device;
   transmitting, via communication interface, the throwing data to an application platform;
   selecting, via another processor at the application platform, a second mobile device as a candidate to virtually catch the object, as represented by a second application on the second mobile device, based on the throwing data and location information of the second mobile device;
   determining, via the other processor, a successful catch of the object by the second mobile device based on the throwing data and the location information of the second mobile device;
   tracking a number of successful catches by a plurality of mobile devices that have been selected as candidates;
   comparing the number of successful catches to a maximum threshold number; and
   terminating the virtually throwing the object when the maximum threshold number of successful catches is reached,
   wherein the throwing data includes angle information, speed information, timing information, and acceleration information, and
   wherein the application platform is remote from both the first mobile device and the second mobile device.

2. A method according to claim 1, further comprising:
   generating a notification message for transmission to the first application, wherein the notification message specifies the successful catch, and the second application indicates the successful catch at the second mobile device.

3. A method according to claim 1, wherein the first application receives input from a user of the first mobile device to form the throwing data, and the second application receives input from a user of the second mobile device to form catching data for determining the successful catch.

4. A method according to claim 3, wherein the applications are gaming applications and the users are players.

5. A method according to claim 1, further comprising:
   attributing a reward point to the second mobile device for the successful catch.

6. A method according to claim 1, further comprising:
   determining trajectory data for the object using the throwing data, wherein the trajectory data is used to select the candidate.

7. A method according to claim 1, further comprising:
   defining a catch area associated with the second mobile device and a user of the second mobile device.

8. An apparatus comprising:
   at least one processor; and
   at least one memory including computer program code for one or more programs,
   the at least one memory and the computer program code configured to, with the at least one processor, cause the apparatus to perform at least the following,
   detect execution of virtually throwing an object as represented by a first application on a first mobile device, wherein an intended recipient of the object is unknown to the first mobile device at the time of virtually throwing the object;
   determine, at the time of the virtually throwing the object, throwing data for the object using sensor information and location information of the first mobile device;
   transmit the throwing data to an application platform;
   select at the application platform a second mobile device as a candidate to virtually catch the object, as represented by a second application on the second mobile device, based on the throwing data and location information of the second mobile device;
   determine a successful catch of the object by the second mobile device based on the throwing data and the location information of the second mobile device;
   track a number of successful catches by a plurality of mobile devices that have been selected as candidates;

compare the number of successful catches to a maximum threshold number; and terminate the virtually throwing the object when the maximum threshold number of successful catches is reached, wherein the throwing data includes angle information, speed information, timing information, and acceleration information, and wherein the application platform is remote from both the first mobile device and the second mobile device.

9. An apparatus according to claim 8, wherein the apparatus is further caused to:

generate a notification message for transmission to the first application, wherein the notification message specifies the successful catch, and the second application indicates the successful catch at the second mobile device.

10. An apparatus according to claim 8, wherein the first application receives input from a user of the first mobile device to form the throwing data, and the second application receives input from a user of the second mobile device to form catching data for determining the successful catch.

11. An apparatus according to claim 10, wherein the applications are gaming applications and the users are players.

12. An apparatus according to claim 8, wherein the apparatus is further caused to:

attribute a reward point to the second mobile device for the successful catch.

13. An apparatus according to claim 8, wherein the apparatus is further caused to:

determine trajectory data for the object using the throwing data, wherein the trajectory data is used to select the candidate.

14. An apparatus according to claim 8, wherein the apparatus is further caused to:

define a catch area associated with the second mobile device and a user of the second mobile device.

15. A method comprising:

executing, via a processor, an application on a mobile device to virtually throw an object, wherein an intended recipient of the object is unknown to the mobile device at the time of virtually throwing the object;

generating, via the processor, at the time of virtually throwing the object, throwing data using sensor information and location information of the mobile device;

transmitting, via communication interface, the throwing data to an application platform for selecting, via another processor at the application platform, a candidate device to virtually catch the object based on the throwing data and location information of the candidate device;

tracking a number of successful catches by a plurality of mobile devices that have been selected as candidates, comparing the number of successful catches to a maximum threshold number; and terminating the virtually throwing the object when the maximum threshold number of successful catches is reached, wherein the throwing data is transmitted to the application platform without any prior communication being directed from the mobile device to any other mobile device that is selected as the candidate device to virtually catch the object, wherein the throwing data includes angle information, speed information, timing information, and acceleration information, and wherein the application platform is remote from both the first mobile device and the candidate device.

16. A method according to claim 15, wherein the object is presented as an image on a display of the mobile device.

17. An apparatus comprising:

at least one processor; and at least one memory including computer program code for one or more programs, the at least one memory and the computer program code configured to, with the at least one processor, cause the apparatus to perform at least the following, execute an application on a mobile device to virtually throw an object, wherein an intended recipient of the object is unknown to the mobile device at the time of virtually throwing the object;

generate, at the time of virtually throwing the object, throwing data using sensor information and location information of the mobile device;

transmit the throwing data to an application platform for selecting at the application platform a candidate device to virtually catch the object based on the throwing data and location information of the candidate device;

track a number of successful catches by a plurality of mobile devices that have been selected as candidates;

compare the number of successful catches to a maximum threshold number; and terminate the virtually throwing the object when the maximum threshold number of successful catches is reached, wherein the throwing data is transmitted to the application platform without any prior communication being directed from the mobile device to any other mobile device that is selected as the candidate device to virtually catch the object, wherein the throwing data includes angle information, speed information, timing information, and acceleration information, and wherein the application platform is remote from both the first mobile device and the candidate device.

18. An apparatus according to claim 17, wherein the object is presented as an image on a display of the mobile device.

* * * * *